United States Patent
Golwalkar et al.

(10) Patent No.: US 7,962,583 B2
(45) Date of Patent: Jun. 14, 2011

(54) DYNAMICALLY ADDING PARTITIONS TO BE DISTRIBUTED DIRECTORY SETUP WITH NO DOWNTIME

(75) Inventors: Yogesh V. Golwalkar, Maharashtra (IN); Kristin M. Hazlewood, Austin, TX (US); Magesh Rajamani, Wanowrie Pune (IN); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 11/955,586

(22) Filed: Dec. 13, 2007

(65) Prior Publication Data
US 2009/0157777 A1 Jun. 18, 2009

(51) Int. Cl.
*G06F 15/16* (2006.01)
(52) U.S. Cl. ........................................... 709/220
(58) Field of Classification Search .................. 709/220
See application file for complete search history.

(56) References Cited

U.S. PATENT DOCUMENTS

| | | | |
|---|---|---|---|
| 6,336,134 B1* | 1/2002 | Varma | 709/205 |
| 2004/0003086 A1 | 1/2004 | Parham et al. | |
| 2004/0162955 A1* | 8/2004 | Jones et al. | 711/162 |
| 2007/0156842 A1* | 7/2007 | Vermeulen et al. | 709/217 |

OTHER PUBLICATIONS

Cyrus System Administration, Chapter 9, IMAP, Dianna Mullet & Kevin Mullet 1st Edition Sep. 2000.

* cited by examiner

*Primary Examiner* — Wing F Chan
*Assistant Examiner* — Andrew Woo
(74) *Attorney, Agent, or Firm* — Yee & Associates, P.C.; Jeffrey S. LaBaw (57) ABSTRACT

Dynamically adding n partitions to a distributed directory setup having x existing servers by modifying the configuration file to include the n new servers and implementing a replication setup mechanism with agreements to x+n−1 servers. The migration to dynamically add partitions is carried out while continuing to serve clients.

14 Claims, 5 Drawing Sheets

DYNAMICALLY ADDING PARTITIONS TO BE DISTRIBUTED DIRECTORY SETUP WITH NO DOWNTIME

BACKGROUND

1. Field

The present invention relates to data storage, and more specifically, to systems, methods and computer products for dynamically adding partitions to distributed directories spread across multiple servers while reducing downtime.

2. Description of Related Art

Organizations are growing at fast rate leading to a need to store enormous data in the directory server. However, directory servers have a scalability limit depending on the type of server and the frequency of operations performed. Once the scalability limit is reached the directory server will no longer perform efficiently.

A distributed directory is a mechanism to get around this problem. In a distributed directory environment data is partitioned across multiple directory servers. A proxy server is deployed to sit in front of the partitioned directory servers. This proxy server works like a virtual directory, providing a single large-directory view to client applications. However, the data is actually stored in multiple directories. The proxy merely manages the operations and routing under the covers, hiding all internals from client applications. Proxy servers use hash algorithms to identify where a client request should be routed. Hashing is the transformation of a string of characters into a fixed-length value or key that represents the original string. Hashing may be used to index and retrieve items.

Figure 1A:
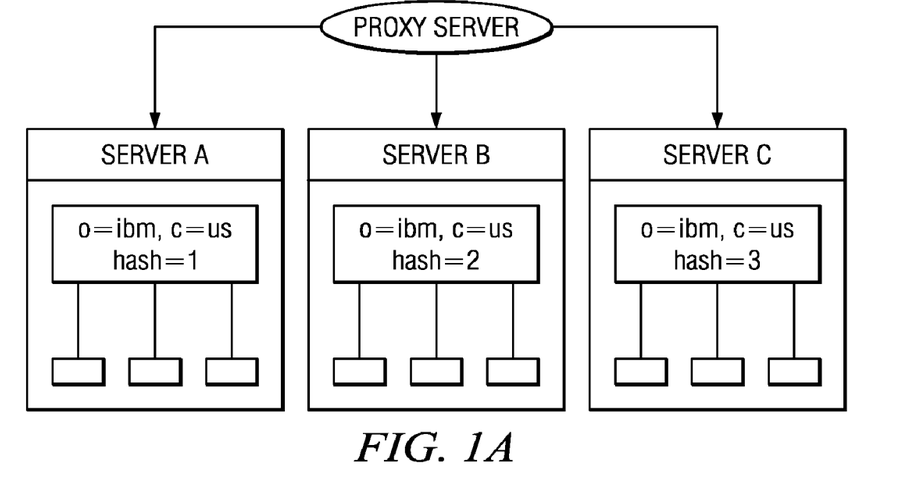
FIG. 1A a typical image of one proxy with three distributed directory servers.
Figure 1B:
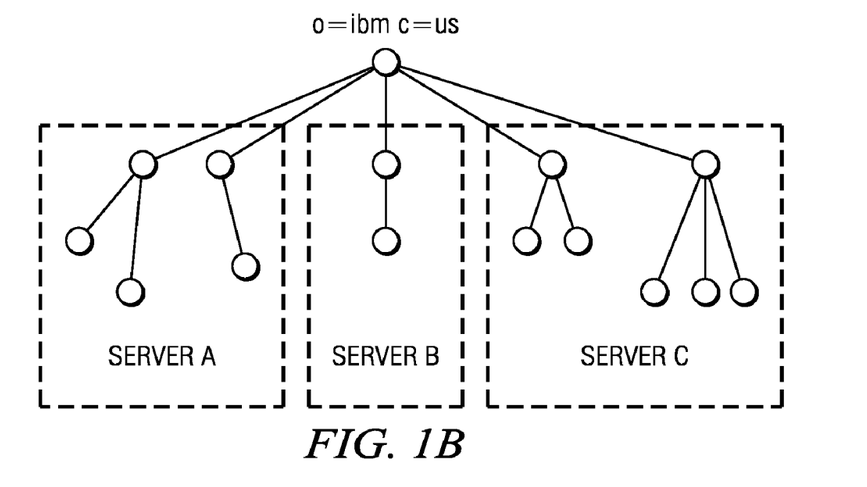
FIG. 1B depicts five branches distributed among the three servers of FIG. 1A.

FIG. 1A depicts a typical image of one proxy with three distributed directory servers. In this image "o=ibm,c=us" is the split distinguished name (DN). Data is split evenly across the directories by hashing on the Relative DN (RIN) just below the base of split. For example entry "cn=entry1,o=ibm,c=us" may go to Server A but all entries below this node will definitely go to Server A only. All backend servers (A, B, C) are required to have split DN (i.e., o=ibm,c=us in this example). FIG. 1B can be used to explain this concept. As per this a branch of Directory Information Tree (DIT) can go to one of the directory servers. This tends to work so long as customers can predict the limit of their directory in the near and/or far future. But unfortunately that is oftentimes not the case. Business and directory scalability requirement is growing faster than anyone can predict. Therefore, it is not unusual to be in a condition where Server A has exceeded its limit and begins performing poorly due to too many entries being present on Server A. Also, directory servers are supposed to be read-centric, and are therefore not optimized for high write frequency. They tend to perform badly if environment is write-centric. Unfortunately it is at this point where more partitions are needed for existing conventional setups, so that writes will be distributed across multiple servers.

Once a given capacity limit has been reached the only conventional solution that exists is to shutdown all the servers, then dump the data and redistribute it in a number of servers having a larger capacity. For example, the data may be loaded in four servers having a larger overall capacity. Only then may conventional systems start the proxy with a new distributed directory setup of the four directories. Redistribution by shutting down the system is not an acceptable solution since it often takes a week, or even longer, to bring the systems back up and get them running. But there is no conventional way around this drawback. There is a need to overcome these drawbacks of conventional systems.

SUMMARY

Embodiments disclosed herein address the above stated needs by providing systems, methods and computer products for dynamically adding partitions to a distributed directory setup. Various embodiments of the present invention are able to add partitions on fly, handling this internally by hiding details from end users. This may typically be done without down time, and during the migration all requests continue to be served, returning valid responses within an acceptably short delay.

The various embodiments include methods, systems and computer products for dynamically adding new partitions to a distributed directory setup with a number "x" of existing servers. This is done in some embodiments by modifying a configuration file to include an additional "n" number of new servers, implementing a replication setup mechanism with agreements to a number equal to "x+n−1" servers, and carrying out a migration to dynamically add the new partitions while continuing to serve clients. Some embodiments modify the configuration file in response to the detecting of a scalability threshold being reached.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

In accordance with the various embodiments partitions can be added on the fly to a distributed directory setup with a smooth migration of entries, during which details of the migration remain hidden from end users. The various embodiments involve an algorithm that allows partitions to be added to existing distributed directory servers on the fly without shutting down the system and without denying incoming requests from users. However, in some embodiments there is a limitation that if existing partitions are extended from "x" to "x+n", then the next extension should wait until the present "+n" migration is completed.

Take, for example, a distributed directory setup with "x" partitions in which it is desired to add "n" more partitions to this setup. In accordance with various embodiments, the proxy server will be informed that "n" new servers are being added to the distributed directory setup. The information will include the "n" new server's information such as host:port information and all other information that is needed for the proxy. The proxy may then modify its configuration file to include the new servers in its configuration. It may also add new partition indexes to the existing servers and any new servers. This will be done as a separate attribute (e.g., "ibm-slapdProxyNewPartitionIndex") which the proxy does not read during normal operations. So, for all client operations proxy will continue to route requests to x servers only and not "x+n". In some implementations the value of new index (e.g., "ibm-slapdProxyNewPartitionIndex") may be different than the old index value to minimize the movement of data across the servers. However, caution should be taken in assigning new numbers to avoid a significant amount of data movement. If the algorithm proposed in this embodiment is used, the backend server should support full replication along with hash mechanism to replicate only desired branches within the replication contexts to the target servers.

In various embodiments the proxy server will setup "Full replication with hash mechanism" on all the "x" backend servers with agreements to "x+n−1" (leaving out own server). The hash index specified in the agreement for each of the target servers will be equal to the new partition index (e.g., "ibm-slapdProxyNewPartitionIndex") defined in the proxy's configuration file for the same server. Due to this, each backend server will start replicating the subtrees that should be migrated due to addition of new partitions. Meanwhile, the proxy server will continue to serve all client operations like it normally does. It will continue to use the "x" partition scheme. Any change that goes to the servers as per the "x" partition scheme will anyway be replicated as per the "x+n" scheme due to the replication setup on backend servers.

A proxy thread runs which queries the replication queue of all "x" servers. In addition, there is a LOW_WATER_MARK value. When the thread determines that the number of entries in the queue is less than the LOW_WATER_MARK value, proxy will temporarily suspend itself. This means it will continue to take requests from clients, but will not process it or send results back to client. This state is called the quiesced state of Proxy. The proxy thread may be configured to continuously query the replication queue status of all "x" servers to see if all are empty. This is the transition time and proxy will automatically move from the "x" partition scheme to the "x+n" partition scheme if all the replication queues are empty. In the "x+n" partition scheme the proxy is in an unquiesced state. In the unquiesced state all unprocessed and new operations go directly to the "x+n" partition scheme. The above proxy thread may be configured to have a time out value. In the event a time out occurs before the replication queues are empty, the proxy will be unquiesced and start serving the request as per the "x" partition scheme only. Once this happens the proxy thread will then typically be configured to sleep for a while again before waking up and doing the same processing again. A timeout of this sort is beneficial to avoid having operations to the proxy possibly suffer from extended delays in adverse situations.

In various embodiments there is also a HIGH_WATER_MARK value for the above thread. If the usage of proxy is above the HIGH_WATER_MARK value the timer thread will simply sleep for some time. It will attempt to check queue status, thus helping the proxy migration to occur during non-peak hours in order to minimize the impact. The replication can be scheduled to be done during off peak hours using scheduled replication.

Once the switch happens, proxy removes the replication setup from all the "x" backend servers, and also sends subtree deletes on all "x" servers for the split DN. This subtree delete is typically not a regular subtree delete. It is preferably sent with nogroup-referential-integrity (NGRI) control. In addition, hash delete control will also be sent. This control specifies that the backend delete only limited branches of the tree which are moved out. The hash-delete control will have list of hash indexes which should be deleted and total number of hash buckets.

Figure 2A:
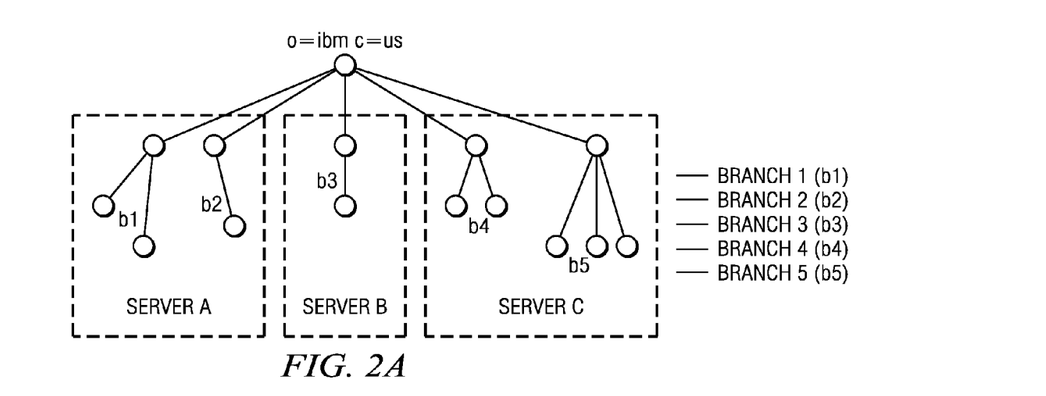
FIGS. 2A-C depict an example in which five branches are redistributed from a three-partition scheme to a five-partition scheme.
Figure 2B:
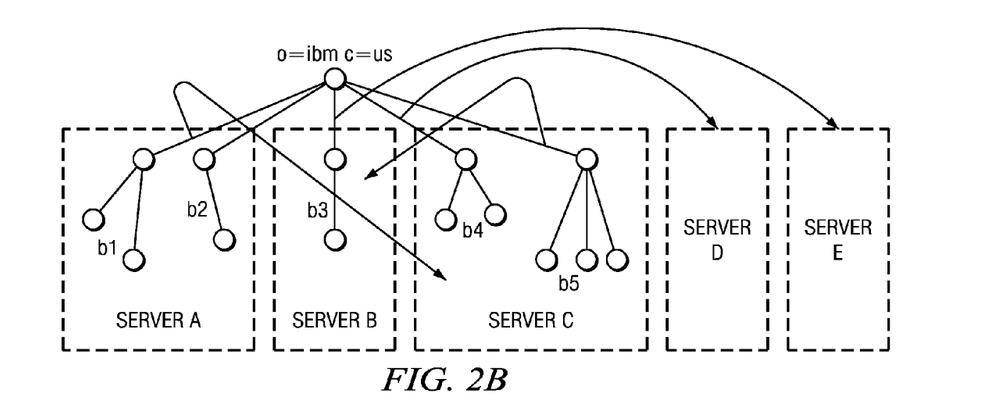
Figure 2C:
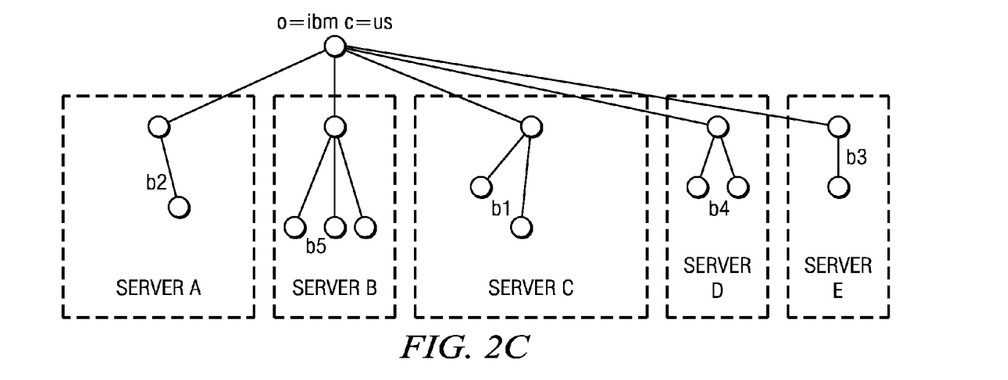

FIGS. 2A-C depict an example concerning partition algorithms for distributed directory servers. Let us assume that initially the proxy was setup with a three-partition scheme as depicted in FIG. 2A with the five branches, b1-b5, being distributed in servers A, B and C as follows: Server A: (b1, b2); Server B: (b3); and Server C: (b4, b5)

This example depicts a situation in which the administrator decided to move towards a five partition scheme. The two new added servers are Server D and Server E. Let us also assume that as per new partition scheme servers will contain following branches: Server A:(b2); Server B:(b5); Server C:(b1); Server D:(b4); and Server E:(b3). The hash replication will be setup to migrate the branches as shown in FIG. 2B. Curved lines show the movement of branches, as per the administrator's new partition scheme. This will be ensured by using hash-replication along with full replication. Once this movement is achieved the new five-partition server scheme will appear as in FIG. 2C.

Note that, while the data redistribution may be correct here, the method is not efficient, as appreciated by the present inventors. Instead, if we identify the correct partition indexes in accordance with various embodiments of the invention, then data movement can be minimized. For the data migration of this example the various embodiments can determine an efficient partitioning scheme to be: Server A:(b1); Server B:(b3); Server C:(b5); Server D: (b2 or b4); and Server E:(b4 or b2).

Figure 3:
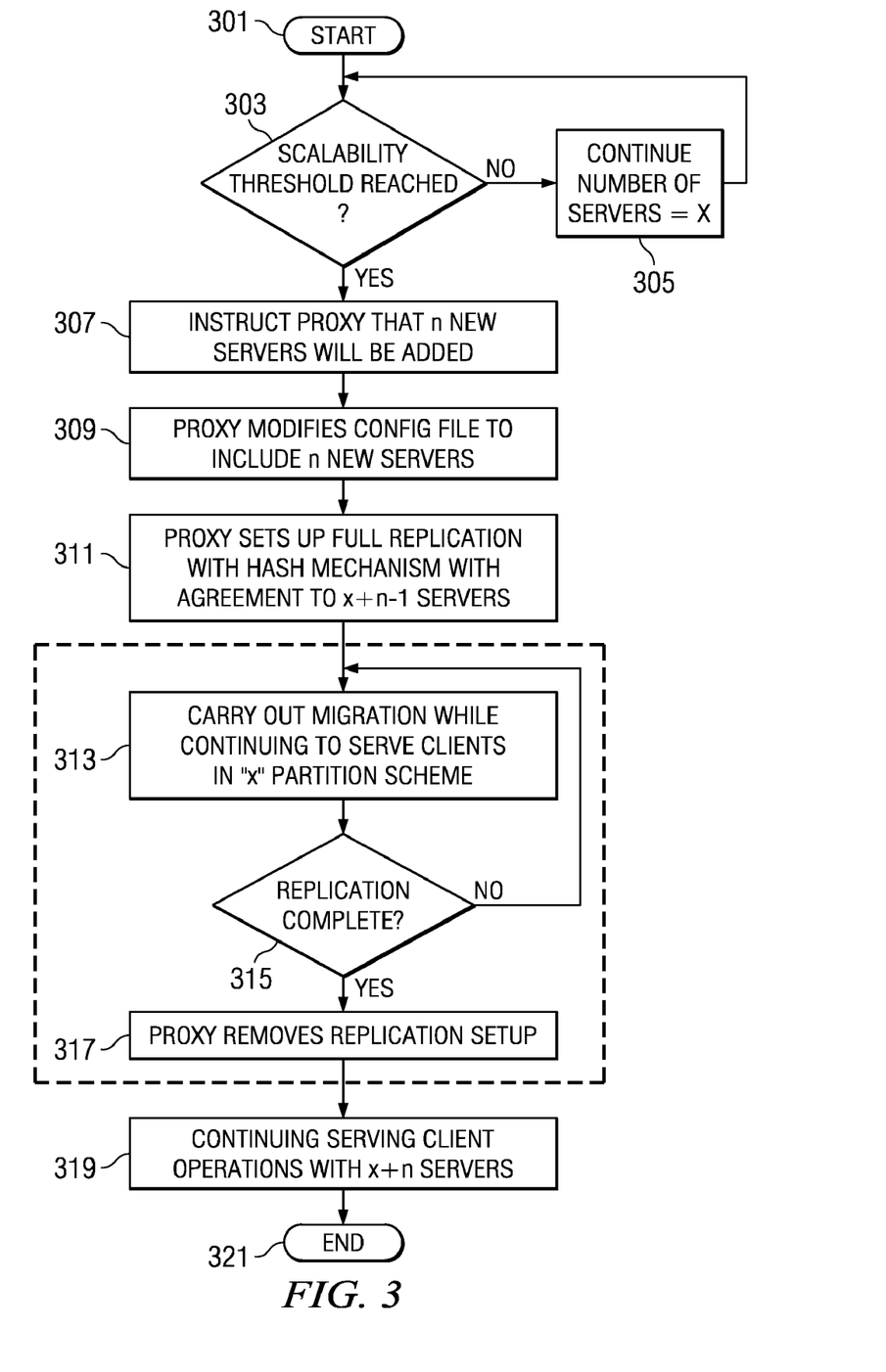
FIG. 3 is a flowchart of an exemplary method 300 for dynamically adding partitions to a distributed directory setup according to various embodiments of the invention.

FIG. 3 is a flowchart of an exemplary method 300 for dynamically adding partitions to a distributed directory setup according to various embodiments of the invention. The method begins at 301 and proceeds to 303 to determine whether the scalability threshold has been reached. The scalability threshold may be detected in a number of manners. For example, the scalability threshold may occur when the existing server(s) have reached a predetermined percentage of their overall capacity (e.g., 90% full, 95% full, 97% full, or any other predefined percentage between 80% and slightly less than 100%). If it is determined in 303 that the scalability threshold has not yet been reached the method proceeds from 303 along the "NO" branch to 305 to wait for the threshold to be reached. Once the scalability threshold has been reached the method proceeds from 303 along the "YES" branch to 307.

In 307 the proxy server is instructed that n number of new servers will be added to the existing x servers, expanding the storage capacity to x+n. The method then proceeds to 309. In block 309 the proxy server modifies the configuration file to include the n new servers. The method then proceeds to 311 where the replication is setup within the backend servers. The proxy sets up a full replication with hash mechanism for agreement to the number of new servers. Each of "x" backend servers has a replication agreement with the other servers, (x+n−1). Here the "−1" means leaving the own backend server. For example if x=2, and n=1 then there are total 3 servers. In this example server1 will replicate to server2 and server3 only, for x+n−1=2+1−1=2 servers. The proxy itself doesn't typically take part in replication. It just sets up the replication between the backend servers.

Figure 4:
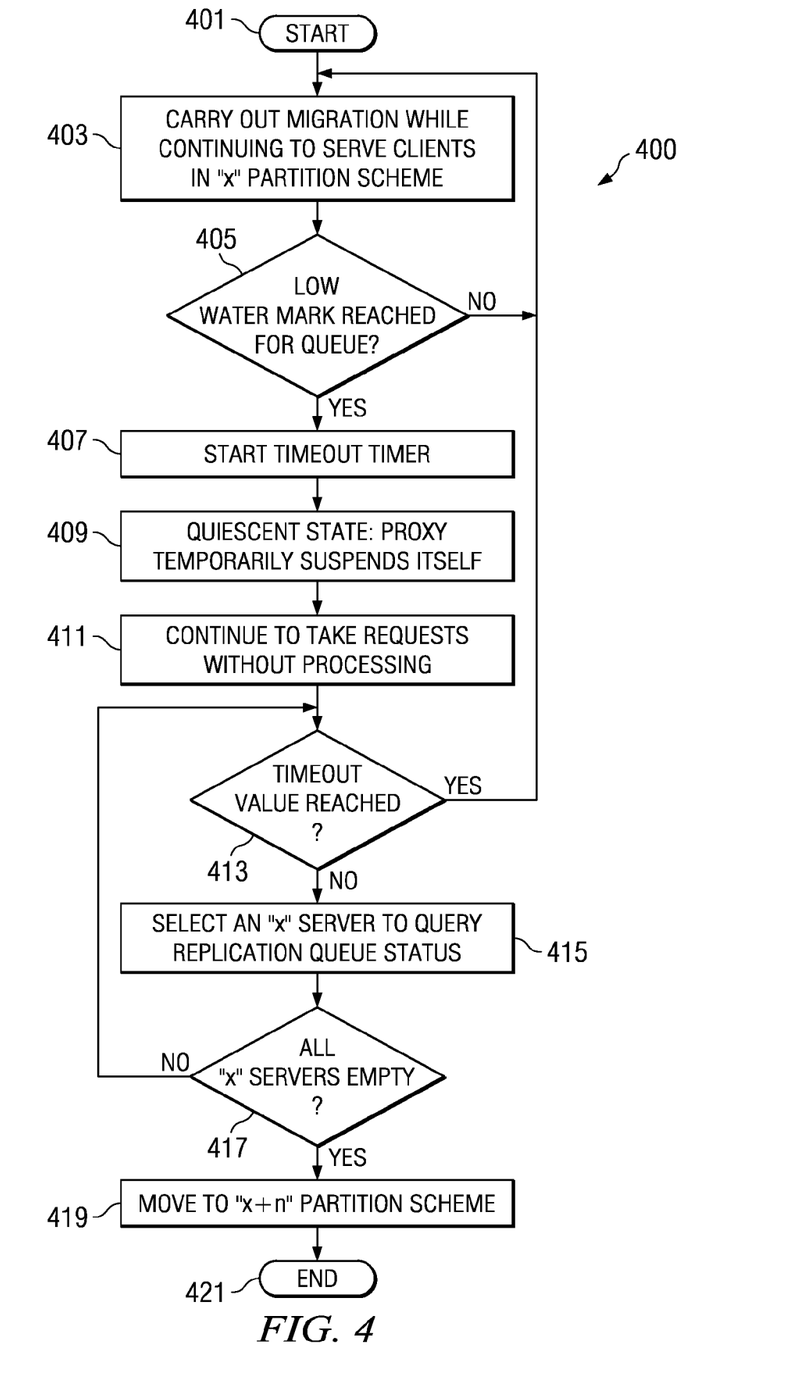
FIG. 4 is a flowchart of an exemplary method 400 for carrying out the server replication and conversion to an x+n partition scheme according to various embodiments of the invention.

Upon completing 311 the method proceeds to 313 to commence the migration, all the while continuing to serve clients using the "x" partition scheme. Further details of the migration activities for blocks 313-317 (within the dotted line of FIG. 3) are depicted in FIG. 4, and discussed below. During this time each backend server replicates the subtrees that are to be migrated due to the addition of new partitions, as illustrated in FIG. 2B. The method then proceeds to 315 to determine whether the replication is complete. If the replication is determined to be unfinished, the method proceeds from 315 along the "NO" path back to 313. Once the replication is complete the method proceeds from 315 along the "YES" path to 317.

In 317 the proxy removes the replication setup. The method proceeds to 319 to continue serving client operations with the new x+n partition arrangement for the servers. The method then proceeds to 321 and ends.

FIG. 4 is a flowchart of an exemplary method 400 for carrying out the server replication and conversion to an x+n partition scheme according to various embodiments of the invention. FIG. 4—in particular, blocks 403-419—further illustrates the activities of blocks 313-317 of FIG. 3. The method begins at 401 and proceeds to 403 (which is akin to 313 of FIG. 3). In 403 the migration commences, during which time the servers continue to server client requests using the "x" partition scheme. In 403 the "x" servers replicate all subtree that are to be migrated due to the addition of new partitions (e.g., as shown in FIG. 2B). The method then proceeds to 405 to determine whether a Low Water Mark has been reached for the migration.

The Low Water Mark is a predetermined number (e.g., set by the system administrator, or as a default value) representing a number of entries remaining in the replication queue. The Low Water Mark may be expressed as a number of entries, such as: 100, 1 k, 1M, or any number between these values, or other like number. The Low Water Mark may also be expressed as a percentage of the server capacity, such as: 0.01%, 0.1%, 1%, 10%, or any number between these values, or other like number. If it is determined in 405 that the Low Water Mark has not yet been reached, the method loops back around from 405 along the "NO" branch to 403 to continue with the replication activities. However, once it is determined in 405 that the Low Water Mark has been reached the method proceeds from 405 along the "YES" path to 407.

In 407 the timeout timer is started. The timer may measure a number of clock iterations, the passage of time, or any other like parameter indicating an expenditure of computing resources or time during the quiescent state. Once the timer has been set the method proceeds to 409 to temporarily suspend the proxy and begin the quiescent state. During this time proxy continues to accept requests, as indicated in 411, but does not process them until such time as the "x+n" partition scheme has been implemented (or the proxy has reverted to the "x" partition scheme upon detecting a timeout condition). The requests may be activities initiated by a user, by software, or by a process, with the activities involving the retrieval, the storage, or the manipulation of files or other data stored in the server. The method then proceeds to 413.

Block 413 determines whether the timeout value has been reached. If the timeout value is reached without fully completing the server replication the method proceeds from 413 along the "YES" branch back to 403, reverting to the "x" partition scheme until the Low Water Mark is again reached, starting the process over. The timeout may be implemented as a precaution against incurring significant delays or building up too many unprocessed requests during the quiescent state. Returning to block 413, so long as it is determined that the timeout value has not yet been reached the method proceeds from 413 along the "NO" branch to 415. In 415 the status of one of the "x" servers is queried to determine whether it is empty, that is, to determine whether the replication is complete for that "x" server. The method then proceeds to 417.

In 417 it is determined whether all of the "x" servers are empty (replicated). If not, the method proceeds from 417 along the "NO" branch back to 413 to again check the timeout value. However, once it is determined in 417 that all the "x" servers are empty the method proceeds from 417 along the "YES" path to 419. In block 419 the proxy implements the "x+n" partition scheme. Once this is completed the method proceeds to 421 and ends.

Figure 5:
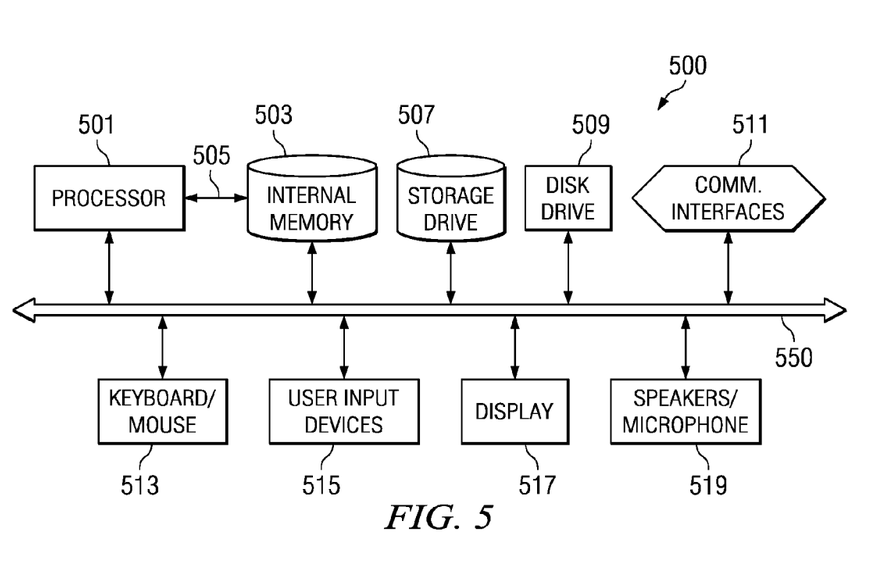
FIG. 5 is depicts an exemplary computer system 400 suitable for implementing and practicing various exemplary embodiments.

FIG. 5 depicts an exemplary computer system 500 that may be used to implement various embodiments of the invention. The computer system 500 includes a processor 501 which may be embodied as a microprocessor or central processing unit (CPU). The processor 501 is typically configured to access an internal memory 503 via a bus such as the system bus 550. The internal memory 503 may include one or more of random access memory (RAM), read-only memory (ROM), cache memory, or a combination of these or other such circuitry configured to store information in a retrievable format. In some implementations the internal memory 503 may be configured as part of the processor 501, or separate from it but within the same packaging. The processor 501 may be able to access internal memory 503 via a different bus, or via control lines (e.g., local bus 505) than it uses access the other components of computer system 500.

The computer system 500 also typically includes, or has access to, one or more storage drives 507 and floppy disk drives 509. The storage drive 507 is often a hard disk drive configured for the storage and retrieval of data, computer programs or other information. The floppy disk drives 509 may include a combination of several disc drives of various formats that can read and/or write to removable machine readable medium. The machine readable medium may be any of the various available storage formats, including, for example, CD-R, CD-RW, DVD, DVD-R, floppy disk, or the like. The computer system 500 may either include the storage drives 507 and floppy disk drives 509 as part of its architecture (e.g., within the same cabinet or enclosure), as connected peripherals, or may access the storage drives 507 and floppy disk drives 509 over a network, or a combination of these. The storage drive 507 is often used to store the software, instructions and programs executed by the computer system 500.

The computer system 500 may include communication interfaces 511 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The components of computer system 500 may be interconnected by a bus 550 and/or may include expansion slots conforming to any of various industry standards such as PCI (Peripheral Component Interconnect), ISA (Industry Standard Architecture), or EISA (enhanced ISA).

Typically, the computer system 500 includes one or more user input/output devices such as a keyboard and/or mouse 513, or other means of controlling the cursor (e.g., touchscreen, touchpad, joystick, trackball, etc.) represented by the user input devices 515. A display 517 is also generally included as part of the computer system 500. The display may be any of several types of displays, including a liquid crystal display (LCD), a cathode ray tube (CRT) monitor, a thin film transistor (TFT) array, or other type of display suitable for displaying information for the user. The display 517 may include one or more light emitting diode (LED) indicator lights, or other such display devices. In addition, most computer systems 500 also include, or are connected to, one or more speakers 519 and microphones 521 for audio output and input. Speech recognition software may be used in conjunction with the microphones 521 to receive and interpret user speech commands.

In regards to the methods disclosed herein for practicing the various embodiments, many of the specified activities and steps may be included, or excluded, or performed in a different order than described above, with the rest of the activities still remaining within the scope of at least one exemplary embodiment. For example, block 519 may be performed after the bid time has expired as determined in block 523, in which case block 521 is performed following the new position of block 519. Other activities may either be omitted or performed in a different order than depicted in the exemplary figures included herein, and still be within the scope of the invention.

The invention may be implemented with any sort of processing units, processors and controllers (e.g., processor 501 of FIG. 5) capable of executing a program of instructions for performing the stated functions and activities. For example, the processor 501 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the internal memory 503 or storage drive 507, e.g. hard disk, CD, flash memory, ram, or other machine readable medium as recognized by one of ordinary skill in the art. The computer software or other programs of instructions can aid or perform the steps and activities described above. For example computer programs stored on computer products (e.g., floppy disks) in accordance with at least one exemplary embodiment may include source code for dynamically adding new partitions to a distributed directory setup with a number "x" of existing servers, including source code for modifying a configuration file to include an additional "n" number of new servers; implementing a replication setup mechanism with agreements to a number equal to "x+n−1" servers; and carrying out a migration to dynamically add the new partitions while continuing to serve clients. There are many further source codes that may be written to perform the stated steps and procedures above, and these are intended to lie within the scope of exemplary embodiments.

The use of the word "exemplary" in this disclosure is intended to mean that the embodiment or element so described serves as an example, instance, or illustration, and is not necessarily to be construed as preferred or advantageous over other embodiments or elements. The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method of dynamically adding partitions to a distributed directory setup with a number "x" of existing servers, the method comprising:
responsive to reaching a scalability threshold, modifying a configuration file to include an additional "n" number of new servers, wherein the number "x" and the additional "n" number are integers greater than zero;
determining usage of a proxy server;
delaying a migration for a predetermined amount of time if the usage of the proxy server is determined to be greater than a predetermined value;
implementing a replication setup mechanism with agreements to a number equal to "x+n−1" servers; and
carrying out the migration to dynamically add the partitions while continuing.

2. The method of claim 1, further comprising:
conducting operations for replicating the "x" number of the servers while continuing to continuing to serve the clients.

3. The method of claim 2, further comprising:
detecting a low water mark being reached while conducting the operations for replicating the "x" number of the servers;
entering a quiescent state in response to the detecting of the low water mark; and
continuing to accept requests during the quiescent state without processing the requests.

4. The method of claim 1, wherein the replication setup mechanism comprises a full replication with hash mechanism.

5. The method of claim 1, further comprising:
detecting replication completion; and
removing the replication setup mechanism in response to the detecting of the replication completion.

6. The method of claim 5, further comprising:
moving to an "x+n" partition scheme in response to detection of the replication completion.

7. A software product comprising a non-transitory machine readable medium including a program of instructions for dynamically adding partitions to a distributed directory setup with a number "x" of existing servers, wherein the program of instructions upon being executed on a device causes the device to perform activities comprising:
responsive to reaching a scalability threshold, modifying a configuration file to include an additional "n" number of new servers, wherein the number "x" and the additional "n" number are integers greater than zero;
determining usage of a proxy server;
delaying a migration for a predetermined amount of time if the usage of the proxy server is determined to be greater than a predetermined value;
implementing a replication setup mechanism with agreements to a number equal to "x+n−1" servers; and
carrying out a migration to dynamically add the partitions while continuing to serve clients.

8. The software product of claim 7, further comprising:
conducting operations for replicating the "x" number of the servers while continuing to continuing to serve the clients.

9. The software product of claim 8, further comprising:
detecting a low water mark being reached while conducting the operations for replicating the "x" number of the servers;
entering a quiescent state in response to the detecting of the low water mark; and
continuing to accept requests during the quiescent state without processing the requests.

10. The software product of claim 7, wherein the replication setup mechanism comprises a full replication with hash mechanism.

11. The software product of claim 7, further comprising:
detecting replication completion; and
removing the replication setup mechanism in response to the detecting of the replication completion.

12. The software product of claim 11, further comprising:
moving to an "x+n" partition scheme in response to detection of the replication completion.

13. A proxy server configured to dynamically add partitions to a distributed directory setup with a number "x" of existing servers, the proxy server comprising:
connections to a plurality of servers, the plurality of servers and the proxy server equaling a number "x+n" servers;
memory configured to store instructions for modifying a configuration file to include a number "n" of new servers in addition to "x" number of the existing servers responsive to reaching a scalability threshold, wherein the instructions determine usage of a proxy server, delay a migration for a predetermined amount of time if the usage of the proxy server is determined to be greater than a predetermined value, implement a replication setup mechanism with agreements to a number equal to "x+n−1" servers, wherein the number "x" and the additional "n" number are integers greater than zero; and
a processor configured to carry out the migration to dynamically add the partitions while continuing to serve clients.

14. The proxy server of claim 13, further comprising:
detecting replication completion; and
removing the replication setup mechanism in response to the detecting of the replication completion.

* * * * *